(No Model.)
J. E. PIMLEY.
Flower Pot.
No. 231,086. Patented Aug. 10, 1880.
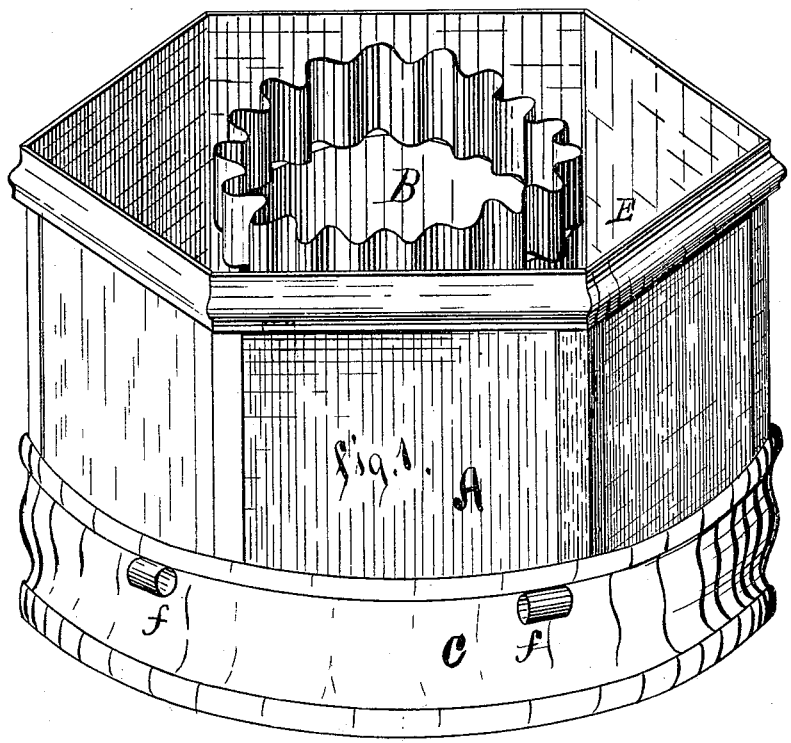
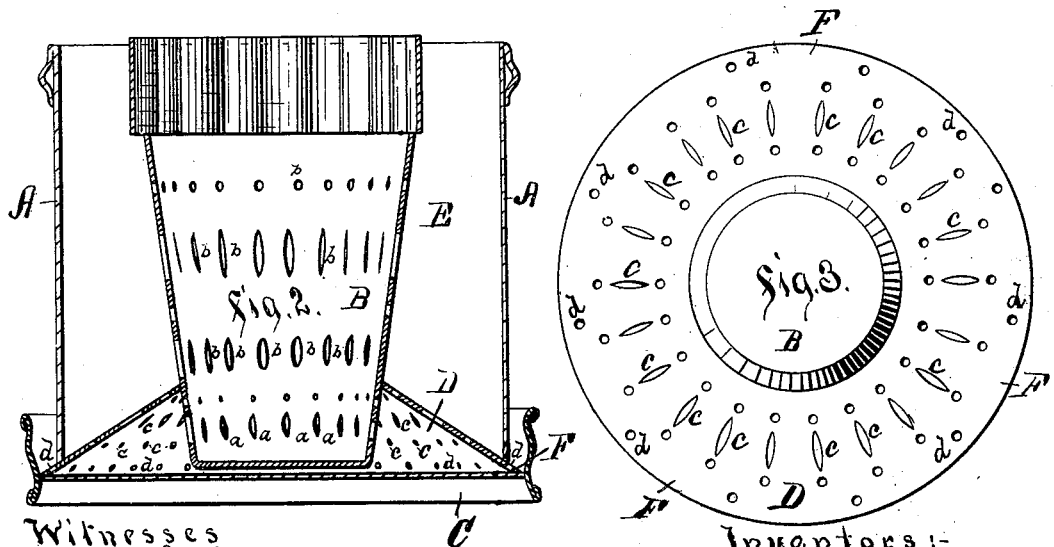
Witnesses
Charles H. Hill
Chas. Herr.
Inventor:-
James E. Pimley.
By O Drake, Atty.

UNITED STATES PATENT OFFICE.

JAMES E. PIMLEY, OF NEWARK, NEW JERSEY.

FLOWER-POT.

SPECIFICATION forming part of Letters Patent No. 231,086, dated August 10, 1880.

Application filed May 14, 1880. (No model.)

*To all whom it may concern:*

Be it known that I, JAMES E. PIMLEY, of the city of Newark, in the county of Essex and State of New Jersey, have invented certain new and useful Improvements in Flower-Pots, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in the construction and arrangement of flower-pots, or devices for raising and cultivating flowers, ferns, or other plants, by means of which the earth contained therein is kept in a healthy producing condition, thereby promoting the growth and vigor of the plants, &c. The devices are adapted to be used as hanging boxes or baskets, as well as for the purposes of ordinary flower-pots and ferneries.

The invention consists in the combination, with a metallic pan or saucer, of an outer and inner receptacle constructed and arranged as follows, to-wit: The former is provided with a conically-formed or arched bottom, which bottom projects outside, so as to form a flange or rim extending below the sides of said receptacle, and is perforated both outside and inside of the receptacle aforesaid. The inner receptacle is considerably smaller in circumference than the outer one, but about the same in depth, and passes entirely through the arched bottom of the latter, to which it is also tightly and rigidly secured by soldering or otherwise, the sides thereof, (not the bottom,) both above and below the arched bottom of the aforesaid outer receptacle, being perforated; all as will be hereinafter more fully and specifically set forth and claimed.

The accompanying drawings illustrate the nature of the invention, in which Figure 1 is a perspective view; Fig. 2, a vertical transverse section of the same, and Fig. 3 is an inverted plan view of the earth and flower receptacle, showing more fully the perforated bottom.

Similar letters of reference indicate like parts in each of the several figures.

A is an outer box or receptacle, B an inner box or receptacle, and C a metallic pan or saucer for the reception of the same and for water.

The outer and inner boxes or vessels may be made round, square, or polygonal in form, the inner vessel being composed of metal, and the outer of metal or wood having a metal lining on the inside, for the purpose of resisting the absorption of moisture from the earth contained in the vessels, consequent upon the use of wooden or earthen vessels.

The outer vessel, A, is provided with a conical, pyramidal, arched, or concaved perforated bottom, D, as indicated in Figs. 2 and 3, the inner vessel, B, being rigidly secured to said bottom and projecting below the same, and also being perforated both above and below said bottom, as plainly shown in Fig. 2, the perforations being marked by the letters $a$ and $b$.

A chamber, E, is formed by the walls of the outer and inner vessels, for the reception of earth and for the growth of plants.

The inner vessel is also designed to be wholly or partially filled with soil for a plant to grow in, or for the absorption of moisture from the pan C beneath, through the perforations $a$ at the bottom, and the distribution of said moisture to the earth contained in the chamber formed by the walls of the inner and outer vessels through the apertures $b$ in the side walls of said inner vessel; or, if desired, the earth may be removed from the inner vessel and an ordinary flower-pot set therein.

The outer vessel has a perforated bottom, so formed, as above stated, that the water contained in the pan in which it sits may come in contact at the bottom of said outer vessel with the outer portion of the earth contained therein through the perforations $c$, the inclined bottom causing the water to flow naturally toward the outside, as will be readily understood by referring to Fig. 2.

The water, it will also be observed, comes in direct contact with the outer portion of the earth in the inner vessel, which is perforated at the sides, but not at the bottom. In consequence of the perforations $a\ b\ c$, and also of the perforations $d$ in the flange or flanges F, outside of the vessel A, (said flanges in this case forming a part of the conical bottom,) the soil is prevented from becoming soggy, sour, and unhealthy, as has frequently been the case with flower-pots heretofore in use, to the injury or loss of the plants.

The perforations $d$, above referred to, furnish means for the escape of foul or heated air and the admission of pure air at the bottom, which is so essential to the healthy growth of the plant.

Water may be supplied at the top or bottom at pleasure, as required.

The pan C is designed to be permanently or removably secured to the vessel A, as may be desired or occasion require, and the whole be capable of being suspended from the ceiling before a window, door, or at any other appropriate place, for which purpose suitable hooks or eyes $f$ are attached to the pan C, or to the vessel A, or both, if desired, to which cords or wires may be connected for suspending them. These eyes are also so placed on opposite sides of the vessels as that cords or wires may be passed therethrough and stretched from post to post or partition to partition horizontally, and the vessels be tilted or moved from side to side thereon, the better to receive the light or heat of the sun, or as convenience or taste may suggest.

Having thus described my invention, what I claim, and desire to have secured by Letters Patent, is—

1. A combined flower-pot and hanging box, composed of an outer box or vessel having a concave or conically-formed perforated bottom extending outside and below the sides thereof, an inner pot or vessel rigidly secured to said outer vessel and having perforations in the side or sides thereof, and a metallic pan for the reception of said vessels A B, the whole being constructed, combined, and arranged to operate substantially as and for the purposes set forth.

2. The combination, with a metallic pan or saucer, of an outer and inner receptacle, the former provided with a conically-formed or arched bottom, forming a flange or rim extending below the sides of said receptacle and perforated both outside and inside thereof, and the said inner receptacle passing through and being secured to said arched bottom, its sides being perforated both above and below the arched bottom aforesaid, substantially as and for the purposes set forth.

In testimony that I claim the foregoing I have hereunto set my hand this 28th day of April, 1880.

JAMES E. PIMLEY.

Witnesses:
OLIVER DRAKE,
CHARLES H. PELL.